CONTROL APPARATUS FOR ELECTRONIC DIMMERS

Filed Oct. 7, 1968 3 Sheets-Sheet 1

INVENTORS
Stephen J. Skirpan
John K. Chester
BY
George C. Bower
ATTORNEY

INVENTORS
Stephen J. Skirpan
John K. Chester
George C. [illegible]
ATTORNEY

CONTROL APPARATUS FOR ELECTRONIC DIMMERS

Filed Oct. 7, 1968

INVENTORS
Stephen J. Skirpan
John K. Chester
BY George C. Bower
ATTORNEY

United States Patent Office 3,534,224
Patented Oct. 13, 1970

3,534,224

CONTROL APPARATUS FOR ELECTRONIC DIMMERS

Stephen J. Skirpan and John K. Chester, New York, N.Y., assignors to Skirpan Electronics, Inc., Long Island City, N.Y., a corporation of New York Filed Oct. 7, 1968, Ser. No. 765,446
Int. Cl. G05f 1/00
U.S. Cl. 315—296 11 Claims

ABSTRACT OF THE DISCLOSURE

In an incandescent light dimming system having two separate banks of lights, a capacitor in a control apparatus is charged and discharged by transistor circuits energized by positive and negative signals from a flip-flop circuit actuated by a push button switch, pulse circuits or the like. The capacitor is connected to the input of a transistor current amplifier for producing inversely varying signals in response the negative ramp or positive ramp voltages of the capacitor and applying the signals to two sets of dimmers connected to their respective banks of lights to inversely vary the outputs thereby increasing the illumination of one bank and decreasing the illumination of the other bank. Pulse circuits provide signals at the end of the ramp voltages for application to the flip-flop circuit to continuously cycle the dimmers and the bank of lights.

BACKGROUND OF INVENTION

The invention relates to control apparatus for use in conjunction with electronic lighting intensity control circuits. More particularly, it relates to such control apparatus which is to be used with so-called "electronic dimmers," in applications wherein it is desired to effect accurate intensity control of large lamp loads and dimming or cross-fading of these lighting loads. Typical applications include theatrical, television studio, display, and architectural lighting.

In the present state of the art of lighting control, it has become common practice to employ a plurality of devices, such as power amplifiers or electronic dimmers, to variably control the intensity of large lamp loads. These devices can control many kilowatts of lamp loads with a low level signal of only milliwatts strength; the latter control signal being suitably provided by miniature potentiometer remote controls. These devices also provide other advantages such as enabling presetting and proportional mastering.

Although the use of the above-mentioned type control for electronic dimmer devices results in manifold advantages in a variety of applications, such use presents several distinct disadvantages. For example, in motion picture theatres, it is necessary for the house lights, and quite often for the stage or curtain lights, to be slowly and smoothly dimmed from full intensity to blackout before film projection begins. Similarly, it is also necessary for these lights to be gradually brought to full intensity at the end of a film or at intermissions. In this latter connection, it is important that the change from blackout to full intensity be gradual, since a rapid change in intensity would actually cause discomfort to the viewing audience whose eyes had become adapted to a low illumination level. With the presently known electronic dimmers, it is necessary for a motion picture projector operator to slowly adjust control potentiometers to achieve the desired gradualness. Such necessary manipulation of potentiometers prevents the operator from giving his full attention to other important duties during a period when such full attention is most necessary. It is readily appreciated that the above described disadvantage appears not only in house lighting control in movie theatres, but is also present in legitimate theatres, night clubs, television studios, and the like.

In an attempt to solve the problem presented by the foregoing disadvantage, one approach has been to attach motors with slow-speed drives to the potentiometer controls and, in turn, to control the motors with push buttons. This approach, while partially successful in demanding less of the operator's attention, suffers from the deficiency of causing difficulty in the adjusting of the "fade" rate. Of course, such motor arrangements include moving parts that are subject to wear and require maintenance. The latter are added disadvantages as compared to presently used electronic devices which are inert or solid state in design and consequently suffer substantially no wear and require practically no maintenance.

Another disadvantage presented by presently used dimmer controls is that they do not lend themselves to automated lighting control, the latter being often required in display work. In display work, for example, it is desirable for electronic dimmers to be automatically controlled by a programming device to continuously adjust and cross-fade lighting loads. Since most programming devices, such as punched tape machines, are digital in nature and thereby provide a signal with only two possible voltage levels rather than an analog signal, if such digital signal is applied directly to an electronic dimmer, the operational function of the dimmers is not accomplished, since, when it is activated, it can only operate as a switch.

Accordingly, it is an important object of this invention to provide a control device to be used in lighting control systems which overcomes the aforementioned disadvantage.

It is another object of the present invention to provide a control apparatus for lighting control systems which can effect controlled dimming and intensification of lighting systems when the control pulses are digital in nature and thus unsuitable for direct control of electronic dimmers.

It is a further object of this invention to provide control apparatus for lighting control systems which is simple, relatively inexpensive, and is substantially maintenance free.

SUMMARY OF THE INVENTION

A control apparatus for connection to electronic dimmer means controlling the intensities of illumination of respective sets of lamps comprising means for producing a positive or ascending ramp voltage or a negative or descending ramp voltage in response to differentiating applied signals and amplifier means connected to the ramp voltage producing means for applying inversely varying output control signals to electronic dimmers.

For a better understanding of the invention, together with other and further objects thereof, reference is made to the following description, taken in conjunction with the accompanying drawings, and its scope is pointed out in the appended claims.

DESCRIPTION OF A PREFERRED EMBODIMENT

Figure 1:
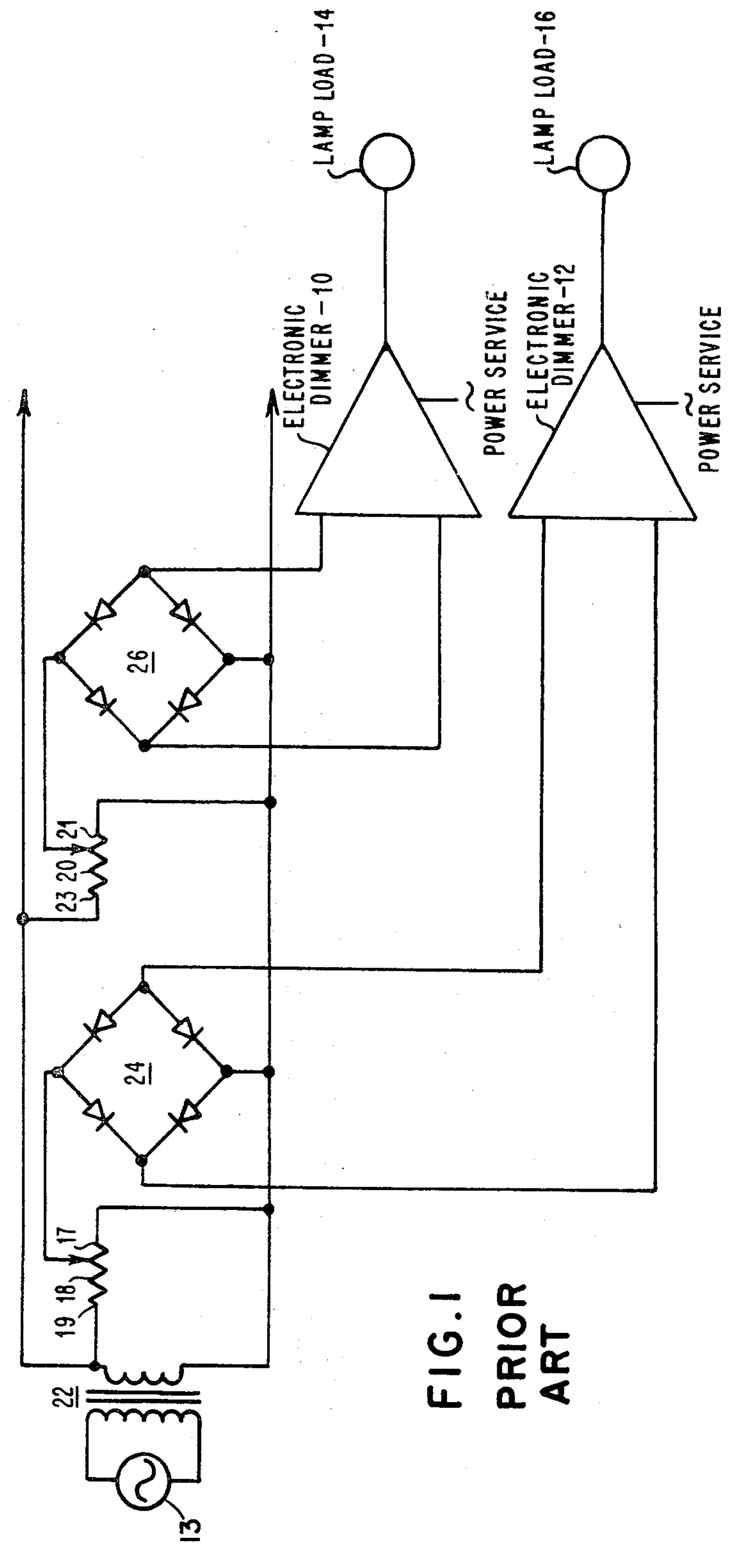
FIG. 1 PRIOR ART
FIG. 1 is a schematic diagram of a known circuit for controling electronic dimmers.

In FIG. 1 is shown a presently known device which can control many kilowatts of lamp loads with a low level signal of only milliwatts provided by a miniature potentiometer remote control. In this device, the electronic dimmers 10 and 12 are connected in series between the power source 13 and lamp loads 14 and 16, respectively. A transformer 22 functions to step down line voltage supplied to the potentiometers 18 and 20 and the full wave rectifiers 24 and 26. Full wave rectified signals controlled by potentiometers 18 and 20, are supplied to dimmers 12 and 10, respectively. As potentiometer 18 is adjusted between its limits 17 and 19 and potentiometer 20 is adjusted between its limits, 21 and 23 the signal levels to dimmers 12 and 10 are respectively varied. The power output to lamp loads 14 and 16 is thereby adjusted and the level of light intensity controlled. An electronic dimmers is described in Pat. No. 3,397,344 to Stephen J. Skirpan, for a Lighting Control Apparatus issued Aug. 13, 1968.

As has been mentioned hereinbefore, the device shown in FIG. 1 permits the miniaturization of the control means in large systems and enables presetting and proportional mastering. However, it requires the attention of the operator to a disadvantageous degree and does not lend itself to automation.

Figure 2:
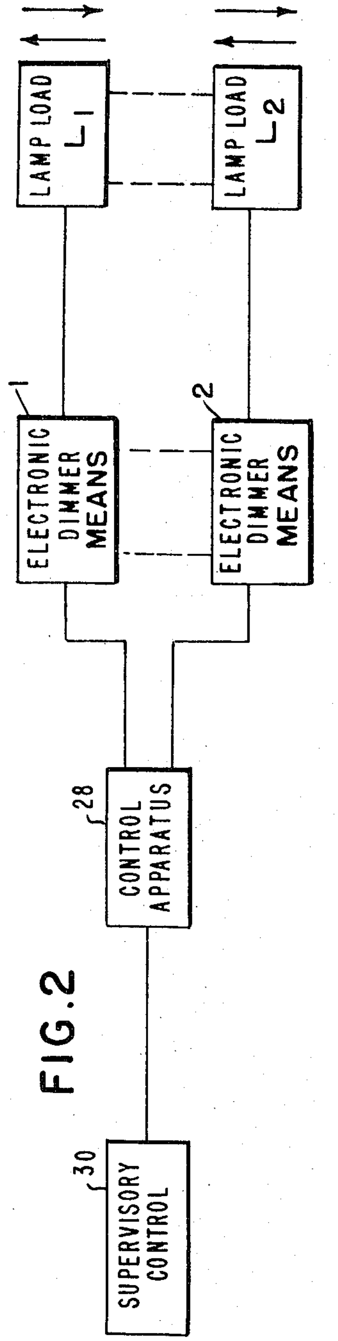
FIG. 2 is a block diagram indicating the principle of operation of the invention.
Figure 3:
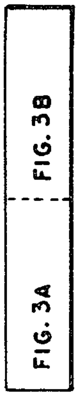
FIG. 3 illustrates the unity of the circuits of the control apparatus FIGS. 3A and 3B.

In FIG. 2 a plurality of electronic dimmer means 1 and 2 which supply current to lamp loads $L_1$ and $L_2$ are varied by the control apparatus 28 which is actuated by the supervisory control apparatus 30. The electronic dimmer means are conventional and the supervisory control apparatus may be push button control stations, a programmer or other suitable means. The control apparatus 28 is constructed in accordance with the principles of the invention and illustrated in detail in FIGS. 3A and 3B which are shown in FIG. 3 as forming a single unit. Direct current and voltage is provided across capacitor 44 by a conventional power supply 37 comprising a full wave bridge rectifier 38 connected to an AC source 32 by transformer 36 and switch 34.

Figure 3B:
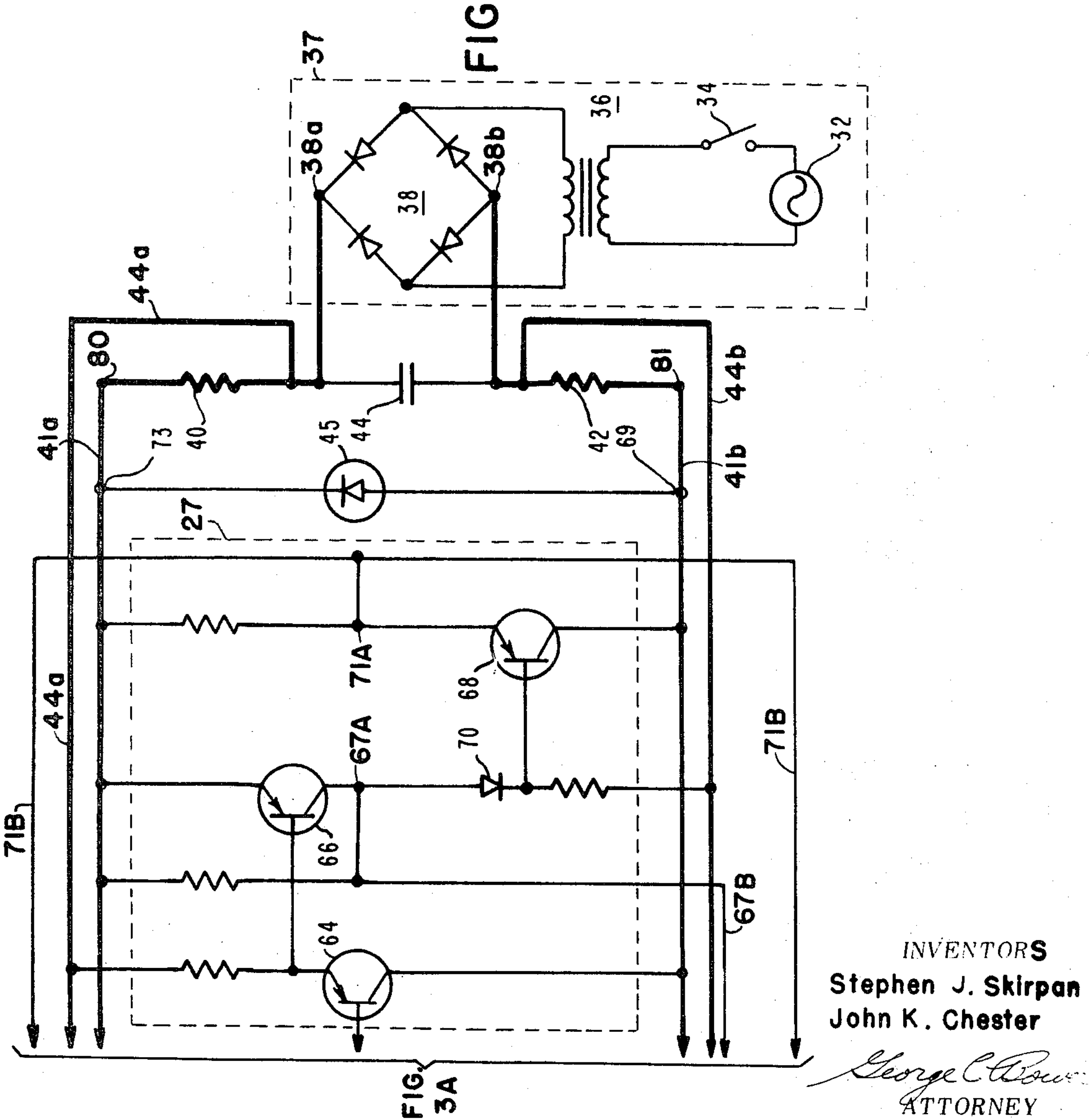
FIGS. 3A and 3B schematically illustrate the circuits of the control apparatus.

Unregulated power lines **44*a*, 44*b* are connected to terminals 38*a*, 38*b* respectively of the rectifier 38 (FIG. 3B). The regulated power lines 41*a*, 41*b* are connected to the terminals 38*a*, 38*b* through the protective resistors 40, 42 and have the Zener diode 45 connected between the lines to maintain a steady regulated voltage on lines 41*a*, 41*b***.

Figure 3A:
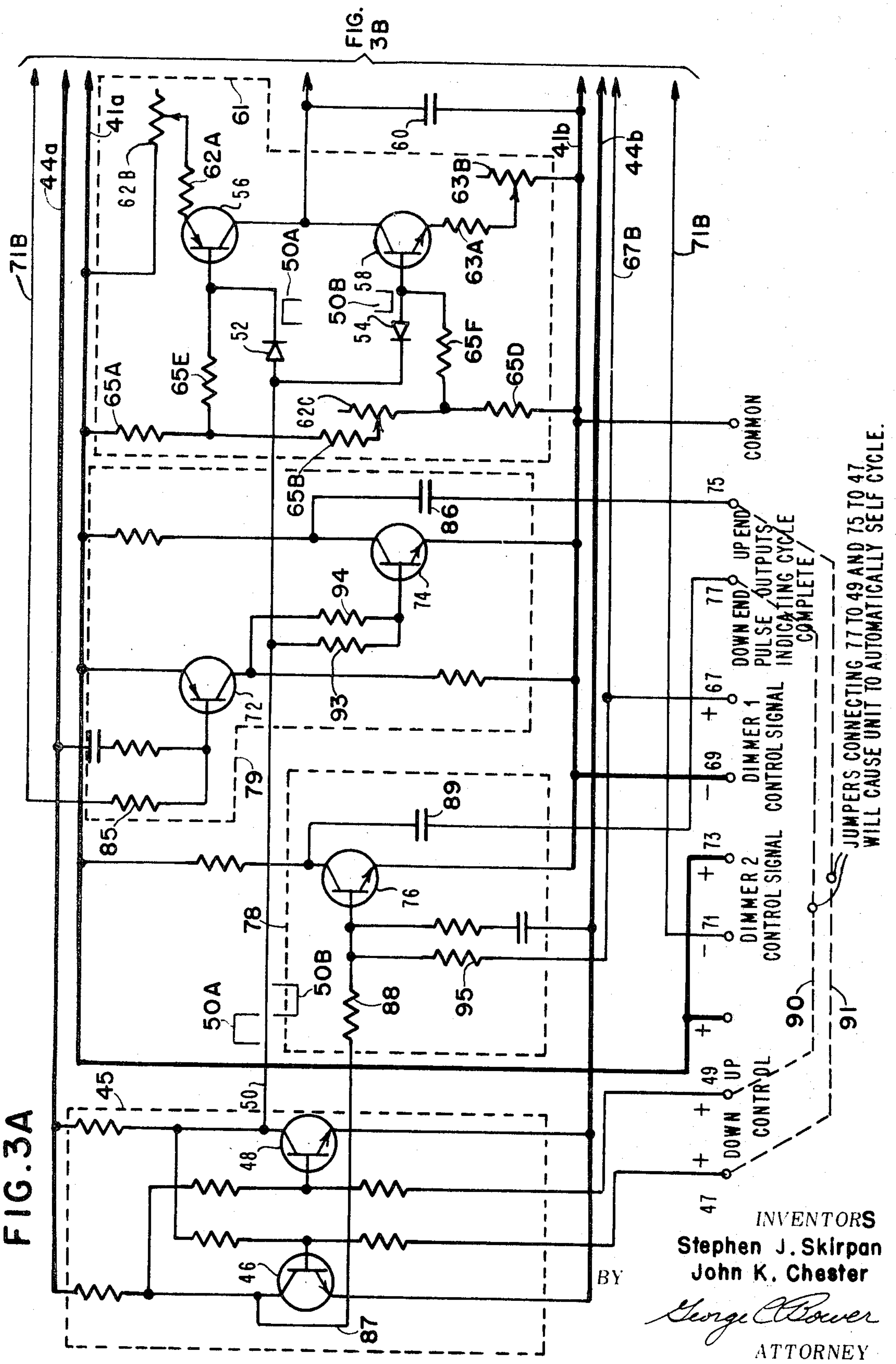

The output control signals are provided at terminals 67, 69 and 71, 73 (FIG. 3A). Electronic dimmer means 1 (FIG. 2) is connected to main output terminals 67, 69 and electronic dimmer means 2 is connected at main output terminals 71, 73. Each dimmer means may be one or more dimmers with one or more lamp loads. On operation of the control apparatus the values of the control signals change in opposite directions so that as the output of dimmer means 1 decreases the output of dimmer means 2 increases, vice versa. The change in control signals is produced by the charge or discharge of capacitor 60 which may be considered a load for the current source 61. In the discharge condition dimmer means 1 is at blackout and dimmer means 2 is at full brilliance.

The charge and discharge of capacitor 60 is controlled by the gated current source circuit 61 (FIG. 3A). This circuit 61 with capacitor 60 forms means for producing ramp voltages. Circuit 61 comprises a charge transistor 56 and a discharge transistor 58. Transistor 56 is connected in series with the resistors 62A, 62B and capacitor 60 across the regulated lines **41*a*, 41*b*. Transistor 56 is normally non-conductive but on being rendered conductive a current whose value is determined by the setting of 62A and 65C passes through capacitor 60**.

The discharge transistor 58 is connected in series with the resistors 63A, 63B across the capacitor 60. The transistor 58 is also normally non-conductive and on being rendered conductive discharges the capacitor 60. The resistors 63A, 63B and 65C control the rate of discharge. Thus the capacitor 60 can be shifted between full charge and zero charge conditions with a gradual change in voltage controlled by the adjustable resistors 62B, 63B and 65C respectively. The change slowly lowers and raises the lights connected to the dimmer means 1 and 2. The resistors 65A, B, C, D, E and F complete the transistor circuits with the adjustable resistor 65C cooperating with the resistors 62B and 63B to control the rate of discharge. The diodes 52, 54 in conjunction with the signals from the flip-flop circuit 45 control whether 56 or 58 conducts.

The gated current source circuit 61 is actuated between the charge and discharge conditions by a conventional bistable circuit having two stable conditions such as flip-flop circuit 45 with transistors 46, 48 and associated resistors. The flip-flop circuit 45 produces a positive signal 50A and a negative signal 50B on line 50. The diode 54 passes the negative signal to render the transistor 58 non-conductive and transistor 56 conductive to charge the capacitor 60 and hold the charged condition. The positive signal 50A is passed by the diode 52 to render the transistor 56 non-conductive and transistor 58 conductive and discharge the capacitor 60. As long as the signals are retained the capacitor is discharged or charged.

The selection of the positive or negative output signals 50A and 50B of the flip-flop circuit is controlled by the signal applied to terminals 47, 49. Pulses may be provided by a manual switch, an automated switch or other suitable means. The sensing circuits 78 and 79 may cycle the control by producing pulsing signals at the terminating ends of a negative slope ramp voltage and a positive slope ramp voltage respectively, as later described herein.

The capacitor 60 is connected to the dimmer control terminals 67 and 71 through the current amplifier 27. The dimmer control terminals 67, 71 are connected to terminals 67A, 71A at the output of the amplifier by lines 67B, 71B (FIG. 3B). The voltage changes across capacitor 60 appear at these terminals and the current is amplified for driving the dimmers. The diode 70 compensates for the base-emitter voltage difference in transistor 68 so that the voltage is the same at terminals 67A and 71A. The current path for dimmer means 1 is from regulated line **41*a* through transistor 66 to terminal 67A then through line 67B to terminal 67 through the dimmer means 1 to regulated line 41*b* on the ground side. The current path for dimmer means 2 is from line 41*b* through transistor 68 to terminal 71A, then through line 71B to terminal 71 and thence through the dimmer means 2 to terminal 73 connected to line 41*a*. The negative or positive ramp voltage of the discharge or charge of the capacitor appears at terminals 67A and 71*a* to impress the negative and positive ramp voltages on the dimmer terminals 67 and 71**.

The ramp voltage developed across capacitor 60 is applied as input to the emitter follower transistor 64 (FIG. 3B). The output of this transistor is applied to the emitter follower transistor 66 (FIG. 3B). The output of transistor 66 is applied to an emitter follower transistor 68.

It is noted that the positive terminal 73 for the control signal for dimmer means 2 is at the potential of the regulated positive terminal 80 of the power supply, and the negative terminal 71 is at the potential appearing at the emitter of transistor 68. The positive terminal 67 for the control signal for dimmer means 1 is at the potential appearing at the emitter of transistor 66 and the negative terminal 69 is at the negative or ground potential of the regulated terminal 81 at the negative end of the controlled power supply. Thus, the sum of the voltages for both signals at all times is substantially equal to the voltage across the controlled power supply, i.e., across control diode 45.

In operation, assuming that an "up" fade is intended, a signal is applied to the up terminal 49 and a negative signal 50B appears on line 50, which renders transistor 56 conductive to cause capacitor 60 to be linearly charged, whereby a positive slope linear ramp voltage is generated, such ramp appearing at terminals 67 and 71. When a "down" fade is intended, a signal is applied to the "down" terminal 47 and a positive signal appears on line 50. The latter signal renders transistor 58 conductive and causes capacitor 60 to be linearly discharged. A linear negative slope ramp voltage appears at terminals 67 and 71.

On capacitor 60 charging the positive slope linear ramp voltage is generated and maximum current is provided to terminals 67, 69 and the load current provided by dimmer means 1 is at a maximum. The voltage difference and current across terminals 71 and 73 decreases reducing the load current from dimmer means 2 to a minimum. On discharge of capacitor 60 a negative slope ramp voltage is produced and the voltage and current at terminals 67, 69 decreases to a minimum and the voltage and current at terminals 71, 73 increases so that the output of dimmer means 1 is at a minimum and dimmer means 2 is at a maximum.

Thus one dimmer means is gradually increased in output and the other is gradually decreased. Of course dimmer means can be connected to one set of terminals to raise and lower the intensity of illumination of lamps without the cross-fading.

The dimmer means may be cyclically raised and lowered by the negative slope ramp sensing circuit 78 and positive slope ramp sensing circuit 79. The circuits 78 and 79 are held in inoperative conditions by signals saturating the circuits during both the positive and negative ramp voltages and are rendered in conductive signal producing states by voltages from terminals 67A and 71A respectively at the ends of these voltages. In the positive slope ramp sensing circuit 79 the transistor 74 is held in a saturated condition by the positive signal 50A applied through resistor 93 during the negative ramp voltage and by transistor 72 through resistor 94 during the positive ramp voltage. The transistor 72 is connected to the terminal 71A by line 71B through the resistor 85. At the maximum value the positive ramp voltage at terminal 71A renders the transistor 72 conductive which in turn renders transistor 74 conductive. A saw-tooth signal appears at terminal 75 through condenser 86. The transistors 72 and 74 are conductive when the positive ramp voltage is at a maximum value and when the maximum value is reached the signal is at a maximum and a pulse signal is applied to the "down" terminal 47. The flip-flop circuit is shifted to the other stable condition and a positive signal 50A causes the capacitor to discharge to lower the lights.

The negative slope ramp sensing circuit 78 is held in a saturated state during the positive ramp voltage by the connection 87 through resistor 88 to the collector of transistor 46 and during the negative ramp voltage the potential at terminal 67A is applied through line 67B and resistor 95 to hold the saturated state. As the voltage decreases on terminal 67A the transistor is shifted from saturation to conduction and a pulse signal appears through capacitor 89 at terminal 77 on the negative ramp voltage reaching its minimum value. The signal at terminal 77 and "up" terminal 49 actuates the flip-flop circuit to change to the other state and create a negative signal 50B to charge the capacitor 60 and raise the lights. The terminals 77 and 75 are connected to terminals 49 and 47 respectively by jumpers 90 and 91 shown in dash lines in FIG. 3A to cause the self-cycling of the control apparatus. These "down" and "up" fade end signals at terminals 77 and 75 may be transmitted to associated control equipment.

Thus, in considering the apparatus disclosed in FIG. 3, it is seen that such apparatus can be controlled by momentary push buttons without requiring continuous operator attendance and will produce a slowly ascending or descending signal to a remote electronic dimmer for the purpose of controlling lamp load intensity slowly and smoothly, in either direction, from full intensity to blackout. Any quantity of remote push button stations may be used to achieve control from various locations, without interference. Because of the presence of potentiometers 62A, 63A and 65B, the fade rate can be continuously adjusted over a large range, such as 10 to 1.

The apparatus generates two output signals, without operator attendance, one of which is slowly ascending and one of which is slowly descending, to two remote electronic dimmers, to thereby achieve a smooth and continuous cross-fade between two lamp loads which are connected to the outputs of the dimmers. In the operation of the apparatus, a pulse is generated near the completion of each control cycle which can be used for continuous self-cycling of the apparatus or to signal other associated control equipment.

In addition, the control apparatus can accept a digital signal from a programming device and, in turn, provide signals for slowly and smoothly fading or cross-fading a plurality of electronic dimmers. The apparatus is of the solid state type, containing no electronic tubes and is substantially maintenance-free.

Various modifications may be made in the foregoing embodiment without departing from the invention as set forth in the appended claims.

We claim:

1. A control apparatus for connection to two electronic dimmer means controlling the intensities of illumination of respective sets of lamps comprising means for producing a positive linear ramp voltage or a negative linear ramp voltage in response to different applied signals, amplifier means connected to said ramp voltage producing means and creating for application to respective electronic dimmer means inversely varying output control signals on occurrence of a ramp voltage to cross-fade the intensities of illumination of the lamps.

2. A control apparatus for connection to two electronic dimmer means as set forth in claim 1 wherein means are provided and connected to said amplifier means for activation by the inversely varying signals at the ends of the ramp voltages for producing pulse signals.

3. A control apparatus for connection to two electronic dimmer means as set forth in claim 1 wherein a circuit having two stable conditions is provided and connected to said ramp voltage producing means to instigate one ramp voltage or the other on change of conditions.

4. A control apparatus for connection to two electronic dimmer means as set forth in claim 2 wherein a circuit is provided having two stable conditions and connected to said ramp voltage producing means to instigate one ramp voltage or the other on change of conditions and means are further provided for connecting said two condition circuit to switch said circuit by the pulsating signals from one condition to the other to cyclically raise and lower the intensity of illumination of sets of lamps connected thereto.

5. A control apparatus for connection to two electronic dimmer means as set forth in claim 1 wherein two pair of main output terminals and a power supply having positive and negative sides are provided and said amplifier means has output terminals, one terminal of one pair is connected to said positive side of said power supply and one terminal of the other pair is connected to said negative side of said power supply and the amplifier output terminals are respectively connected to the other main output terminals.

6. A control apparatus for cross-fading the intensities of illumination of two sets of incandescent lamps through first and second electronic dimmer means, each connected to a respective set of lamps and having a pair of input control terminals and comprising first and second pair of main output terminals for connection to a respective pair of input terminals, power supply having a positive side connected to one of the first output terminals and a ground side connected to one of the second output terminals, a capacitor, capacitor charge means connected in series with said capacitor across said positive and ground lines and on being rendered conductive charging said capacitor, capacitor discharge means connected across said capacitor to discharge said capacitor on being rendered conductive, means for rendering one or the other of said charge or discharge means conductive, a current amplifier having an input connected to said capacitor and having first and second output terminals with the first amplifier output terminal connected to the first pair of main output terminals, and said second amplifier output terminal connected to the second pair of main output terminals to inversely vary the control signals applied to the first and second pair of output terminals on charge and discharge of said capacitor to increase the intensities of illumination of one set of lamps and decrease the intensity of illumination of the other set of lamps.

7. A control apparatus for connection to two electronic dimmers respectively controlling the intensities of illumination of two sets of lamps comprising first and second pairs of output terminals for connection to respective electronic dimmers, an unregulated voltage supply means having a positive line and a ground line, a regulated voltage supply means having a positive line and a ground line, one of said output terminals of one pair connected to said regulated positive line and one of said output terminals of the other pair connected to the regulated ground line, a capacitor, capacitor charging means connected in series with said capacitor across said regulated positive and ground lines and on being rendered conductive charging said capacitor, capacitor discharging means connected across said capacitor to discharge and capacitor on being rendered conductive, a circuit having two conditions of stability and producing a signal of one polarity in one condition and a signal of the opposite polarity in the other condition being connected to said capacitor discharging means and said capacitor charging means to render said discharging means conductive on application of one signal and to render said charging means conductive on application of a signal of opposite polarity, a current amplifier having an input transistor and first resistor in series across said unregulated positive line and said regulated ground line with the input of said transistor connected across said capacitor and having second transistor and resistor connected in series across said regulated positive line and said unregulated ground line with said second transistor connected between the first resistor and input transistor and having a third transistor and resistor in series across said regulated positive and ground lines with the transistor connected between said second transistor and resistor, said second and third transistors having emitters on the side of said second and third resistors, said amplifier having first and second output terminals between the respective second and third transistors and second and third resistors, said first amplifier output terminal connected to said other main terminal of said pair having said output terminal connected to regulated ground line and said second amplifier output terminal connected to said other main terminal of the pair having said output terminal connected to the regulated positive line to inversely vary the control signals applied to electronic dimmers on charge and discharge of said capacitor to cross-fade the lamps.

8. A control apparatus as set forth in claim 7 wherein a positive ramp sensing circuit and a negative ramp sensing circuit are provided that respond respectively at the ends of the positive ramp voltage and the negative ramp voltages to create actuating signals.

9. A control apparatus as set forth in claim 8 wherein said positive ramp sensing circuit has input means connected to said two condition circuit to saturate said positive ramp sensing circuit during discharge and to said second amplifier output terminals for maintaining the saturated condition during charging of said capacitor and unsaturate said circuit at the end of the positive ramp voltage for producing an actuating signal on completion of a positive ramp voltage and said negative ramp sensing circuit has input means connected to said two condition circuit to saturate said negative ramp sensing circuit during charging of said capacitor and connected to said first amplifier output terminal for maintaining the saturated condition during discharging of said capacitor and unsaturate said circuit at the end of the negative ramp voltage for producing an actuating signal on completion of a negative ramp voltage.

10. A control apparatus for connection to electronic dimmer means for controlling the intensity of illumination of incandescent lamp means comprising first and second pairs of output terminals for connection to electronic dimmer means, power supply having a positive side connected to one of first output terminals and a ground side connected to one of the second output terminals, a capacitor, capacitor charge means connected in series with said capacitor across said positive and ground lines and on being rendered conductive charging said capacitor, capacitor discharge means connected across said capacitor to discharge said capacitor on being rendered conductive, means for rendering one or the other of said charge or discharge means conductive, a current amplifier having an input connected across said capacitor and having two output terminals with one intermediate output terminal connected to the other first output terminal and the other amplifier output terminal connected to the other second output terminal to inversely vary the control signals applied to hte first and second output terminals for varying the inensity of illumination of an incandescent lamp load means.

11. A control apparatus for connection to electronic dimmer means for controlling the intensity of illumination of an incandescent lamp load means comprising means for producing a positive linear ramp voltage or a negative linear ramp voltage in response to different applied signals, amplifier means connected to said ramp voltage producing means and creating varying output control signals for application to electronic dimmer means for raising or lowering an incandescent load means.

References Cited

UNITED STATES PATENTS

| | | | |
|---|---|---|---|
| 3,157,821 | 11/1964 | Passmore et al. | 315—314 X |
| 3,448,338 | 6/1969 | Bentham et al. | 315—295 |

JOHN HUCKERT, Primary Examiner

R. F. POLISSACK, Assistant Examiner

U.S. Cl. X.R.

315—291, 292, 293, 294, 307, 311, 312, 314, 315, 317, 322